March 6, 1951  H. J. ZENKE ET AL  2,544,210
APPARATUS FOR MEASURING, WEIGHING, AND LOADING
LOOSE MATERIALS INTO CONTAINERS
Filed March 1, 1945
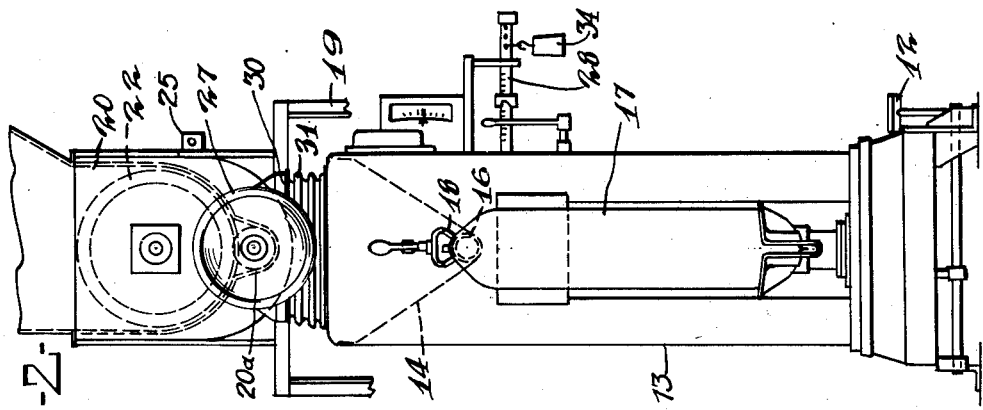
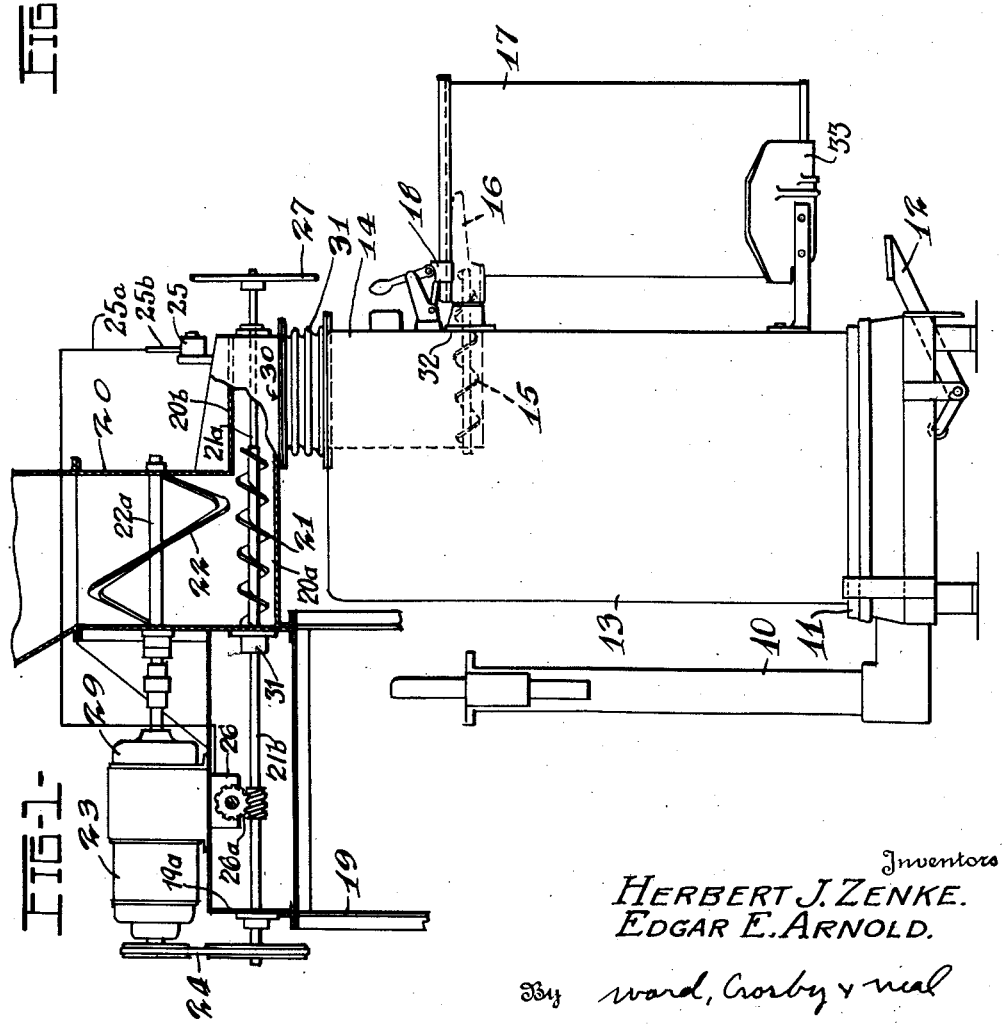
Inventors
HERBERT J. ZENKE.
EDGAR E. ARNOLD.
By Ward, Crosby & Neal
Attorneys Patented Mar. 6, 1951

2,544,210

UNITED STATES PATENT OFFICE 2,544,210

APPARATUS FOR MEASURING, WEIGHING, AND LOADING LOOSE MATERIALS INTO CONTAINERS

Herbert J. Zenke, Oswego, N. Y., and Edgar E. Arnold, Chicago, Ill., assignors to St. Regis Paper Company, New York, N. Y., a corporation of New York Application March 1, 1945, Serial No. 580,466

5 Claims. (Cl. 226—48)

This invention relates to a power-driven machine comprising apparatus by means of which a charge of pulverized, granular, or other loose or rubble-like material may be rapidly measured in specific quantity and then weighed, while being simultaneously loaded into a container.

The invention provides simple and compact apparatus of this description whereby the quantity of material loaded may be automatically controlled or measured in limited quantity by a power-driven conveying device, preferably, though not necessarily, in the form of a screw conveyor.

The invention further provides means for automatically limiting the extent of each successive run of the above-mentioned conveying device, thus controlling the quantity of material loaded; preferably restricting it to an amount less than the total load or charge desired, but closely approximating such amount.

Another feature of the invention is the provision of supplementary, manually-operable means for driving the conveying device above referred to, after the rapid mechanical drive has been automatically terminated, in order to permit of supplying the balance of the charge at a relatively slow rate and thus insure accuracy in the final loading and weighing operation.

Various further and more specific objects, features and advantages of the invention will more clearly appear from the detailed description given below taken in connection with the accompanying drawings which form a part of this specification and illustrate merely by way of example, a preferred form of the invention. The invention consists in such novel features, arrangements and combinations of parts as may be shown and described in connection with the apparatus herein disclosed.

In the drawing:

Fig. 1 is a side elevation of one form of machine comprising apparatus embodying the invention; certain parts being shown in section;

Fig. 2 is a front elevation of the machine shown in Fig. 1.

Referring to the drawing in further detail, a preferred form of the invention comprises an ordinary type of scale 10, having an indicating balance beam 28 and a platform 11, which is provided for weighing operations. Scale 10 is preferably equipped with a pedal 12, by means of which platform 11 may be lifted off of the usual supporting knife edges, when material is being loaded preparatory to a weighing operation, thus protecting the entire scale mechanism from shock and vibratory stresses. A sheet-metal frame or casing 13 of generally rectangular shape, adapted to support certain of the apparatus included in the invention, is installed on platform 11 and is secured thereto in any convenient manner.

The mechanism for holding a container during a filling operation and for injecting a charge of material into it is mounted within and on the exterior of casing 13 in the following mannner:

In the upper portion of casing 13, there is formed a V-shaped chamber 14, Fig. 2, having its upper end open and flanged for connection of a flexible, accordion-like boot 31 or other form of telescopic conduit adapted for the provision of free universal movement between its ends. A relatively small opening 32 adjacent the bottom of chamber 14 communicates with a spout or nozzle 16, which is secured to the exterior of casing 13. Close to the bottom of chamber 14 and extending through opening 32 into spout 16 is a screw conveyor 15 suitably mounted for rotation and which is driven continuously by any suitable source of power (not shown) as by an electric motor mounted within casing 13.

A cradle 33 and a clamping device 18, secured to the exterior of casing 13, are provided for supporting and retaining a container 17 such as a multi-wall paper valve bag, in proper filling position on spout 16.

It is apparent that if scale 10 is equipped with a supplemental, permanently located weight 34 on its beam 28 of sufficient magnitude to exactly balance the total tare weight of casing 13 and the attachments supported thereby, including an empty container 17, the true net weight of the charge injected into the latter will be accurately indicated by said beam in the usual way.

The mechanism for automatically measuring or controlling the amount of the material charge to be loaded into container 17, which constitutes an important feature of the present invention, is mounted on a suitable frame or foundation 19, adjacent casing 13, and is supported independently of scale 10 and the apparatus mounted thereon. This mechanism will now be described.

A hopper or chute 20 is mounted on the right-hand side, Fig. 1, of frame 19 and extends over the top of casing 13 with a convenient amount of clearance therebetween. Rotatably mounted in the throat of hopper 20 by means of a drive shaft 22—a is a spreader or agitator 22 in the form of a steep-pitch, right-hand helix. Shaft 22—a, which extends through and is supported by bearings secured to the side walls of hopper 20, is driven by an electric motor 23 through the medium of reduction gearing mounted within a casing 29. Motor 23 is secured to an extension 19—a of frame 19 and is provided with a belt pulley on the left end, Fig. 1, of its shaft.

The lower portion 20a of hopper 20 is narrowed down into a generally V-shaped trough with an approximately semicircular bottom. This part of the hopper has an extension 20—b of similar conformation extending to the right, Fig. 1, over the opening in the top of chamber 14, and is provided with a flanged opening 30 in its bottom, to which the upper end of boot or conduit 31 is attached. Rotatably mounted in this portion, 20—a, 20—b, of hopper 20 is a left-hand conveying and measuring screw 21 formed on or secured to a drive shaft 21—a. Shaft 21—a, which is parallel to shaft 22—a, extends through and is supported by bearings secured to the side wall of hopper 20 and the end wall of extension 20—b thereof. A hand-wheel 27 is attached to the right-hand end of shaft 21—a and an overrunning clutch 31 is connected with its opposite end.

Aligned with shaft 21—a and drivably connected therewith through clutch 31 is a shaft 21—b, the left end of which, Fig. 1, extends through and is supported by a bearing mounted on extension 19—a of frame 19. On this end of shaft 21—b is secured a belt pulley in line with the previously mentioned pulley on the shaft of motor 23, and a belt 24 drivably connects these two pulleys.

The electric circuit of motor 23 is controlled by two switches 25 and 26. Switch 25 is of the manually operable type and is used for starting motor 23 when a container is to be filled. Switch 26 is of an adjustable, automatic type and is designed to stop motor 23 when it has made any selectable, predetermined number of revolutions, as transmitted (from motor 23 to switch 26) by any suitable means, such as gearing 26—a driven by shaft 21—b. After motor 23 is thus stopped, switch 26 may be returned manually to its initial operative position.

It should here be observed that while the two switches 25 and 26 provide convenient means for accomplishing the desired purpose of starting motor 23 manually and stopping it automatically, the same end may also be accomplished with equal facility by the use of a single switch, without departing from the spirit and scope of the invention. For example, switch 26 may be dispensed with, and switch 25 may be fitted with a releasing device adapted for actuation by gearing 26—a, or equivalent, after motor 23 has made any predetermined number of revolutions. Such a switch would be closed by hand against spring pressure and would be held closed magnetically or mechanically, until released automatically by the motor. The switch 26 instead of being connected directly to the motor 23 for stopping same, may be operatively associated, for example, by means of a conductor 25a with a solenoid 25b connected to switch 25 which is adapted for opening switch 25 by suitable interconnecting means after a predetermined number of revolutions of the motor 23, as above mentioned.

The operation of the particular example of the invention, as disclosed in the preceding part of this specification, is as follows:

For protection of the mechanism of scale 10 during the period of rapid automatic loading, platform 11 should be raised slightly and locked by means of pedal 12. An empty container 17 is then placed on cradle 33, with the spout 16 projecting into its upper portion, and is secured in this position by the clamping device 18. Assuming now that the hopper or chute 20 is amply supplied with material to be loaded into container 17, motor 23 is started by the operator by closing switch 25; switch 26 being previously or simultaneously returned from its open position to its initial starting position, either manually or automatically, as above described.

Motor 23 now rotates spreader 22 at relatively slow speed, through the reduction gearing in casing 29, and also drives measuring screw 21 at relatively high speed through the medium of belt 24, shaft 21—b, clutch 31 and shaft 21—a. The motor shaft and spreader shaft 22—a rotate in a clockwise direction when viewed from the left, Fig. 1, and thus obviously measuring screw 21 is driven in the same direction. Consequently, as spreader 22 is in the form of a right-hand helix and as screw 21 is a left-hand helix, the action of the spreader in the movement of material is generally opposite to that of screw 21, thus insuring the smooth and uniform feeding of material by the latter. For this reason, the quantity of material conveyed from the lower portion 20—a of hopper 20 into its extension 20—b, per each revolution of screw 21, is quite definitely determined and steadily maintained, thus providing a reliable and efficient measuring device for controlling or limiting the amount of material loaded into container 17.

All of the material, which is conveyed into the extension 20—b of hopper 20 by rotation of measuring screw 21, falls through opening 30 and boot 31 into chamber 14, from the bottom of which it is ejected through spout 16 into container 17 by the continuously driven screw conveyor 15.

The number of revolutions which motor 23 must make to charge container 17 with the desired quantity or weight of any given material may be easily ascertained by trial. The stopping switch 26 is then adjusted to stop the motor slightly short of the number of revolutions thus determined. After the motor has been put in operation, as above described, and has completed this predetermined extent of run, switch 26 is automatically opened through the agency of gearing 26—a, thus stopping the motor and measuring screw 21. This immediately cuts off the flow of material from hopper 20 to chamber 14, because, regardless of the quantity of material in the hopper, none can pass measuring screw 21 when its rotation is arrested.

Finally, the operator releases platform 11 by means of pedal 12, so that scale 10 again becomes operative, and he then slowly drives measuring screw 21 by hand-wheel 27 until just enough additional material is fed into chamber 14 and thence into container 17 to tip scale beam 28.

It will be understood that as soon as material passes from the extension 20—b of hopper 20 into chamber 14 and is supported thereby, its weight is added on scale 10 to that of the material already charged in container 17, even before it reaches the latter, and so is immediately indicated by beam 28, if the point of balance is reached.

It is also obvious that all of the material delivered to chamber 14 is quickly transferred into container 17 by the continuously rotating screw conveyor 15. Consequently, when scale 10 is once balanced and rotation of hand-wheel 27 is simultaneously stopped, the balance will still be maintained, even after the residue of material in chamber 14 is delivered to container 17, and the total net weight of the charge loaded in the latter will be the weight steadily indicated by beam 28. It should here be noted that slight movement or vibration of hopper 20 relatively to casing 13, due to the operation of hand-wheel 27 and other causes, will not occasion any interference with the above described weighing operation, because of the universally free connection therebetween, which is provided by the boot or telescopic conduit 31.

During rotation of hand-wheel 27 by the operator, overrunning clutch 31 permits shaft 21—a to be driven independently of shaft 21—b which, therefore, remains at rest. This facilitates manual operation, as it renders it unnecessary to drive motor 23 and spreader 22 through the connecting belt and gearing. It also prevents rotation of the gear mechanism 26—a, and so eliminates all possibility of interference with the setting of automatic motor stopping switch 26, which may be of a type that would not permit of any over-rotation.

As will be observed, by an inspection of the accompanying drawing, all of the devices necessary to the manual control of the machine shown therein are so located and disposed as to be within clear view and easy reach of the operator, when in a position adjacent container 17. These devices comprise starting switch 25, scale pedal 12, scale beam 28, clamping device 18 and hand-wheel 27.

It is now apparent that in the above described form of the present invention, there is provided a simple and compact semi-automatic machine for measuring, limiting and weighing a charge of material and for simultaneously loading it into a container. All of the apparatus included therein is relatively simple and durable and many of the parts are procurable in the open market, which considerably reduces production costs. By providing rapid and dependable means for automatically measuring the major part of a charge while injecting it into a container, a marked saving of time is effected, and by providing manual means for controlling the final loading and weighing operation, accurate results are assured, when due care is exercised by the operator.

While the preceding specification illustrates and describes one embodiment of the present invention, it is evident to those skilled in the art that many alterations and modifications in the arrangement of the apparatus and in the details of design may readily be made without departing from the spirit and scope of the invention, which, it is desired, shall be limited only by the appended claims and prior art. For example, different types of scales, conveyors and motor control apparatus may be used, instead of those above described, without deviation from the invention.

What is claimed is:

1. A valve bag filling apparatus having in combination, a weighing device, a spout mounted upon the weighing device, a saddle also mounted upon said device and adapted for holding a valve bag in filling position upon the spout, a chamber adjacent said spout and mounted upon said weighing device for holding material to be fed to the bag, a charging conveyor in said chamber for forcing material into said spout and into the bag, a hopper mounted independently of said weighing device and positioned to discharge material into said chamber, a measuring screw conveyor in said hopper, power means for moving said measuring conveyor, means for stopping said measuring conveyor after a predetermined number of revolutions thereof, and manually operable means for moving the measuring conveyor for feeding an added small amount of material to the bag after the power means have been stopped.

2. A valve bag filling apparatus having in combination, weighing means, a spout mounted on said weighing means, means for holding a bag in filling relation to the spout, a chamber having an outlet in communication with said spout and an inlet, said chamber being mounted upon the weighing means, a charging conveyor in the chamber adapted for moving material therein through the spout, a hopper mounted independently of the weighing device and having an outlet in communication with said chamber inlet, a measuring screw conveyor positioned in said hopper for moving material therein to and through such outlet, an agitator in said hopper, power means for rotating said measuring screw conveyor and for moving said agitator, automatic means for stopping said power means after a predetermined number of revolutions of said measuring screw conveyor, manually operable means for starting said power means, and manually operable means for rotating said measuring screw conveyor.

3. In apparatus of the class described, a weighing device, a spout for a valve bag mounted upon the weighing device, a bag saddle mounted upon the weighing device for supporting a bag in filling position upon the spout, a bag clamp for holding the bag on said spout during filling, a chamber mounted upon said weighing device and adapted to receive material for filling the bag, a charging conveyor in said chamber adapted for conveying material from the chamber to the spout and into the bag, a hopper in communication with said chamber and supported independently of said weighing device, a measuring screw conveyor in said hopper adapted to measure a predeterminable quantity of material in response to said screw moving through a preselected number of revolutions and to convey same to said chamber, power means for driving said measuring conveyor, means for automatically stopping the power means when said predeterminable quantity is measured, and means for manually moving said measuring conveyor.

4. A valve bag filling apparatus having in combination, a weighing device, a spout mounted on the weighing device, means upon the weighing device for holding the bag in filling relation to said spout, a chamber mounted upon the weighing device for holding material to be weighed and fed to the bag, a charging screw conveyor positioned in said chamber for moving material to and through said spout and into the bag, a hopper mounted above said chamber in spaced relation thereto, the hopper being independently mounted relative to said weighing device and having an outlet positioned for discharging material into said chamber, a measuring screw conveyor in said hopper positioned for moving a predetermined quantity of material per revolution to said chamber through the outlet in said hopper, power means for rotating the measuring screw conveyor, power control means for stopping said power means after a predetermined number of revolutions of said measuring screw conveyor, and manually operable means for moving said measuring conveyor.

5. In a valve bag filling apparatus, a weighing device, a spout mounted on the weighing device, means for holding a valve bag in filling position upon said spout, a chamber mounted upon the weighing device and in communication with the spout, a charging conveyor in the chamber adapted for conveying material therein to and through the spout, a hopper independently mounted relative to the weighing device and having an outlet positioned above said chamber and adapted for discharging material therein, a flexible conduit interconnecting such outlet and said chamber, a measuring screw conveyor in said hopper, a screw agitator in said hopper, said agitator and measuring screw conveyor being adapted to move material in opposite directions relative to one another, power means for rotating said screw conveyor and agitator, means for automatically stopping said power means in response to said screw conveyor having turned a predetermined number of revolutions, and manually operable means for rotating said screw conveyor.

HERBERT J. ZENKE.
EDGAR E. ARNOLD.

REFERENCES CITED

The following references are of record in the file of this patent:

UNITED STATES PATENTS

| Number | Name | Date |
| --- | --- | --- |
| 877,168 | Bradshaw | Jan. 21, 1908 |
| 1,044,475 | Bates | Nov. 19, 1912 |
| 1,247,158 | Sand | Nov. 20, 1917 |
| 1,570,032 | Baldner | Jan. 19, 1926 |
| 1,598,128 | Gasse | Aug. 31, 1926 |
| 1,766,444 | Marsh | June 24, 1930 |
| 1,880,840 | Currier | Oct. 4, 1932 |
| 1,953,646 | Currier | Apr. 3, 1934 |
| 2,098,247 | Jarrier | Nov. 9, 1937 |
| 2,212,419 | Harmon | Aug. 20, 1940 |
| 2,244,718 | Long | June 10, 1941 |

FOREIGN PATENTS

| Number | Country | Date |
| --- | --- | --- |
| 843,683 | France | Apr. 3, 1939 |